March 25, 1952
H. L. LOGAN
2,590,191
SURGICAL LIGHTING
Filed March 27, 1948
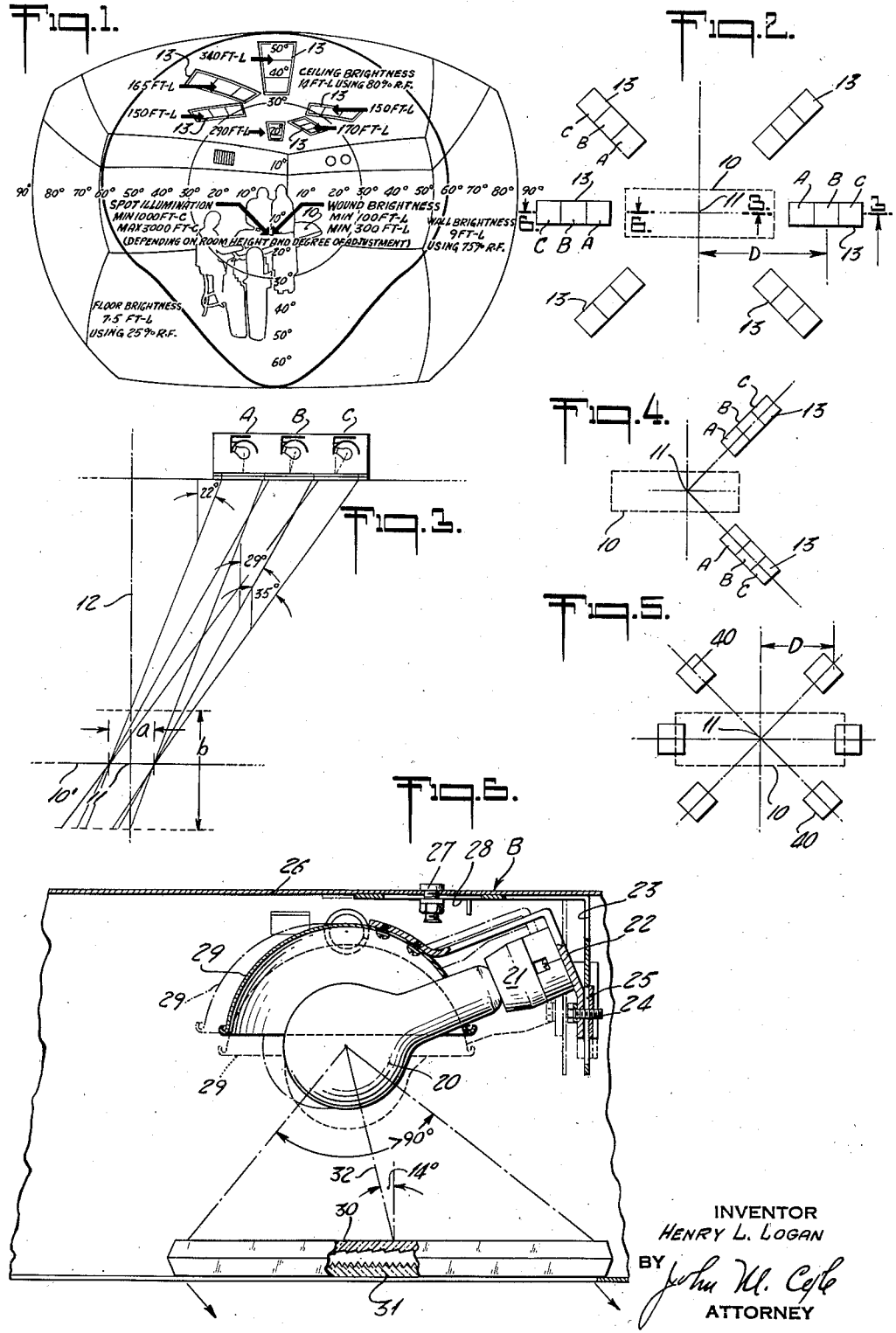
INVENTOR
HENRY L. LOGAN
BY
John M. Cole
ATTORNEY Patented Mar. 25, 1952

2,590,191

UNITED STATES PATENT OFFICE 2,590,191

SURGICAL LIGHTING

Henry L. Logan, New Rochelle, N. Y., assignor to Holophane Company, Inc., New York, N. Y., a corporation of Delaware Application March 27, 1948, Serial No. 17,401

4 Claims. (Cl. 240—1.4)

1

The present invention relates to surgical lighting and is more particularly directed toward lighting systems suitable for use in all classes of surgical operations normally performed on an operating table.

Surgeons frequently operate by necessity near the limits of their visibility, skill and knowledge. They usually operate at the greatest possible speed in order to reduce surgical shock. The more quickly and surely they can see, the less do they depend on their sense of touch. The less the handling of the tissues, the less the shock to the patient; also the less their own tension with its quick fatigue build-up. Hence the quantity of illumination available should therefore be scientifically sufficient.

The limit of normal vision is the ability to see details that are 4/1000 inch wide (1 minute of arc) at normal "reading" distance. An illumination level of 3000 footcandles is sufficient to permit a 98% visual performance rate in recognizing details 4/1000 inch in size when they have a contrast difference of 8%. Such surgery lighting will permit recognition of things so small that 250 can be lined up to an inch; and so nearly the same in appearance as their background that there is only an 8% difference; and at 98% of the rate that could theoretically be achieved with unlimited light.

When only an illumination level of 1000 footcandles is available, it is still sufficient to permit a 98% visual rate in recognizing details 4/1000 inch in size with a contrast difference of 25% or greater; and to permit a 95% visual rate in recognizing the same details with the low contrast difference of 8%.

There is ample illumination to permit maximum visual rates with larger details under any conditions. Details of four minutes in size (16/1000 inch), very small, can be seen at the 98% rate with any contrast at 100 footcandles and less. In fact, with such details sufficient light is provided for theoretically maximum speed to be attained with any contrast difference.

Good seeing for surgical work depends on more than just the amount of light in a spot. Extreme contrasts of brightness in the field of view, create serious drains on the energy of the surgeon. This fatigue is just as exhausting as that caused by physical exertion and reflects just as adversely on his skill. The design of the present surgical lighting system is based upon the recognition of the fact that there must be proper balance of brightness between the wound area and the background. Accordingly, the large spot area of high

2 illumination tapers off to adequate room lighting—with no line of demarcation.

The present invention contemplates the employment of a plurality of sources of light spaced laterally from the vertical axis through the center of the work area over the operating table. By having the light come from these laterally located sources, there is the minimum likelihood of obstruction from the head and shoulders of the surgeon and from the attendants assisting the surgeon, and vertical surfaces may be illuminated.

The present invention contemplates that the light sources will be located so that it is possible to obtain high levels of illumination on both vertical and horizontal surfaces in a region of substantial width and depth, and that a light can be obtained from the various azimuths.

Operating rooms are usually classified as major operating rooms, delivery rooms, and minor surgery operating rooms. In the major and minor surgery operating rooms, facilities must be present so that operations can be performed in any position with respect to the table, and with the table tilted in various positions. Hence, in these two types of operating rooms it is desirable to have light come from all azimuths so that vertical and horizontal surfaces may be illuminated in the desired direction and shadows avoided. In delivery rooms, however, lighting need only come from one end of the table and a smaller number of lighting units will suffice.

The present invention contemplates that the major and minor surgery rooms will have lighting systems of similar spatial layout, the major surgery lighting system to be capable of delivering much higher lighting intensities than the minor systems. In the delivery room system, provision is made for obtaining higher intensities than the minor surgery system but only in the needed directions.

In carrying out the present invention, all the luminaires employed in any particular system are preferably alike. They are recessed in the ceiling or mounted below the ceiling of the room at a common level and so oriented that the maximum light output is directed toward the center of the operating table. Each luminaire employed has a lens-lamp-reflector system prefocused so as to place the maximum beam candle power in the direction of the work region. Where comparatively low intensities will suffice, as in the minor surgery system, sufficient light may be obtained from an arrangement in which only one luminaire is at each azimuth; but where higher intensities are necessary as in major surgery or delivery room work, a plurality of luminaires disposed along a given radius with provisions made for adjusting the obliquity of the beam from the respective luminaires is required.

The accompanying drawings show for purposes of illustrating the present invention an embodiment in which the invention may take form, together with modified arrangements of luminaires, it being understood that the drawings are illustrative of the invention rather than limiting the same.

In the accompanying drawings:

Figure 1 is a perspective view of a major surgery operating room, with illumination data superposed;

Figure 2 is a diagrammatic plan view of a major surgery system;

Figure 3 is a diagrammatic vertical section taken on the line 3—3 of Figure 2;

Figures 4 and 5 are views similar to Figure 2, indicating a delivery room system and a minor surgery room system, respectively; and Figure 6 is an enlarged sectional view taken on the plane 6—6 of Figure 2.

In Figures 1, 2, 4 and 5, an operating table is indicated at 10. The center of the operating table is indicated at 11 in each case, and the vertical axis through the center of the table is indicated at 12, Figure 3. In the major surgery system of Figures 1-3, the ceiling of the room carries six multiple luminaire light boxes 13. Two of these are arranged as shown opposite the head and the foot of the table. The other four are arranged in pairs opposite one another and in directions oblique to both the longitudinal and transverse planes of the table. Each of the light boxes 13 carries three luminaires, indicated at A, B and C. It may be recessed or surface attached.

One of the luminaires, for example, central luminaire B, is shown in greater detail in Figure 6. It has an incandescent lamp 20 carried in a lamp socket 21, mounted on a strip 22. This socket carrying strip 22 is secured to an angle bracket 23 by a bolt 24 passing through a vertical slot 25. The angle bracket 23 is secured to the box 26 by a bolt 27 passing through an elongated slot 28. The socket support 22 also carries a hemispherical reflector 29. The slot 28 extends in the direction of the plane lengthwise of the box, so that it is possible to shift the lamp and reflector in the radial plane 6—6 both horizontally and vertically. The light output of the lamp and reflector is intercepted by a compound light controlled lens system having two plates 30 and 31, whose physical center is offset so that the median ray 32 is at an angle of about 15°. The parts are preferably so proportioned that the top lens accepts all the light within an oblique pyramid with an apex angle between the sides in excess of 90° as apparent from the figure.

The plates 30—31 are provided with suitable prismatic constructions such that they convert the downwardly directed light rays in this pyramid into a beam of substantially parallel rays having an oblique direction. This makes it possible to have all the refractors for controlling the light in a common horizontal plane as indicated in Figure 3 and to direct the light rays downwardly and laterally to bring them toward the work area where the high illumination is desired. The lower member of the lens pair is made of heat absorbing glass. Where a plurality of optically independent luminaires are arranged in each azimuth, it is necessary to adjust the angle of beam-throw so that the high intensity light rays are not spread over too large an area.

In any particular layout, the ceiling height must be considered. These ceiling heights vary widely and inasmuch as the desired range of obliquity of the light needed in the work area remains the same, irrespective of ceiling height, it is necessary to vary the spacing of the lighting equipment from the vertical axis of the system. The table below indicates the proper dimension D (Figure 2) for various ceiling heights, and it also shows the vertical angle of beam-throw of the luminaires A, B and C when so located it being understood that the same luminaires will be used at all locations and in installations of various ceiling heights.

*Vertical beam throw for 3 ceiling hts.*

| Box No. | 9' | 10' | 12' |
| --- | --- | --- | --- |
| A---------------degrees-- | 19 | 22 | 25 |
| B---------------do---- | 27½ | 29 | 30½ |
| C---------------do---- | 35 | 35 | 35 |
| Dim. D--------------------- | 3' | 3'-8" | 5'-1" |

By suitably locating the lamp boxes 13 relative to the axis of the system as determined by the height of the ceiling line, one can, by the supplemental adjustments available in the lamp reflector mounting, secure an adequate variation in the angle of maximum light intensity so that the output of all the luminaires is brought into one area. The employment of light boxes of standard dimensions in operating rooms of various ceiling heights and the desire to keep the beam-throw within angles of 35° from the vertical affects the variation in the angle of beam-throw for the luminaires A and B as indicated in the table.

By connecting up the various lamps to suitable control switches, it is of course possible to vary the intensity of light received and the azimuths in which it is received. Failure of a single lamp does not greatly affect the illumination level.

In a typical installation, as shown in Figure 3, the ceiling light is 10 feet from the floor and is 6 feet 8 inches from the plane in which the maximum lighting intensity is desired. With a 3-luminaire light box and 150 watt lamps with 12" square lenses and having its center located 3 feet 8 inches from the axis of the system, one can by suitable adjustment of the lamp-reflector mounting obtain beams of substantially parallel light rays at angles of 22°, 29° and 35°, so that these beams will be directed onto the work area.

Inasmuch as the same types of 3-luminaire lamp boxes are employed in the various positions about the axis of the system, it is possible to place in the work area high light intensities coming from lenses one foot square and from all six directions or any selected direction so that in a rather extensive area of width $a$ (Figure 3) and throughout a very substantial depth $b$ the high intensities of illumination are available for lighting both horizontal and vertical surfaces. This illumination is received at angles varying from 22° to 35° so that shadowing from the surgeon or his assistants is avoided and so that light can be directed into a deep incision irrespective of whether the table is flat or tilted.

Reference to the diagram of Figure 1 will show that the brightness contrasts throughout the entire operating room are extremely low. The lighting units run a maximum of 3½ times the wound brightness, and the lenses of such units cannot come onto the surgeon's line of sight even when he looks up during an operation. The lenses that can cross his glance are only 1½ times brighter than the minimum wound brightness—and less bright than the maximum wound brightness.

Careful measurements of comfortable natural fields of view over a long period of time show the range of brightness contrasts to average 48 to 1. The range in a typical operating room illuminated by the new surgery lights is 45 to 1 (see Figure 1). This is the spread between maximum lens brightness and floor brightness, but even this small spread is not encountered by the surgeon during his work. The greatest spread he can get is between the wound brightness and the floor, which is less than half the spread in comfortable, natural fields of view, or 20 to 1.

Owing to the high intensities adjacent the wound area, the use of a white cover cloth is not recommended. Experience has shown that ambient temperature rises are moderate and that spot temperature rises are harmless.

In the delivery room lighting system, shown in Figure 4, two light boxes 13—13 are employed arranged at about 45° to the longitudinal axis of the table, and each of these boxes carries three luminaires A, B and C. In the minor surgery system of Figure 5, the lamp box such as 40 carries a single lamp-reflector-lens combination.

The light control plates 30 and 31 are disposed in a horizontal plane and are for the purpose of converting the downwardly symmetrical beam of divergent rays into the desired oblique beam of substantially parallel rays. Various optical constructions may be employed for this purpose with various optical efficiencies and losses. For example, upper plate 30 may be a Fresnel lens designed to deliver light rays in parallel directions and the lower plate 31 may be a plate with parallel refracting prisms which bend this beam laterally. Another form of construction which may be used is a lens pair symmetrical about a vertical axis, such as shown in Rolph Patent No. 2,310,810. A third form of lens construction, however, is that shown in Patent 2,495,320, granted to Kurt Franck January 24, 1950. The plates shown therein are asymmetric and designed for beam-throw in a narrow horizontal angle and are of higher efficiency than either of the other two forms of construction for the purpose here intended.

The luminaire shown herein forms the subject-matter of Divisional Application, Serial No. 225,020, filed May 7, 1951.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:
1. Means for lighting an extensive surgical work area above an operating table and of substantial depth to secure high levels of illumination in horizontal planes and in vertical planes in selected azimuths, comprising a plurality of luminaires mounted at a higher elevation than the work area and remote from a vertical axis through the center of the work area, each luminaire including a lighting unit having an incandescent lamp, an inverted hemispherical reflector, a horizontal lens system accepting the direct and reflected rays throughout a solid angle of substantially 90° and concentrating them into a beam of parallel rays of substantial cross sectional area and oblique to the vertical, each lens system being oriented to direct the beam in the direction of the vertical plane through the center of the work area and the corresponding lamp, and means for mounting each lamp and reflector for independent vertical and horizontal movement in said vertical azimuthal plane to maintain its orientation and obtain variation in the obliquity of the beam so that the output of all of the units may be caused to cross in said work area.

2. Lighting means as in claim 1 having six luminaries, two directing light lengthwise of the operating table and four directing light diagonally crosswise of the table, there being three pairs directly opposite one another.

3. Lighting means as in claim 1, wherein each luminaire has three similar lighting units all in the same azimuth and the lamps and reflectors are positioned to converge all three beams onto the same spot.

4. Lighting means as in claim 1, having six luminaires, two directing light lengthwise of the operating table and four directing light diagonally crosswise of the table, there being three pairs directly opposite one another; and wherein each luminaire has three similar lighting units all in the same azimuth and the lamps and reflectors are positioned to converge all three beams onto the same spot.

HENRY L. LOGAN.

REFERENCES CITED
The following references are of record in the file of this patent:

UNITED STATES PATENTS

| Number | Name | Date |
| --- | --- | --- |
| 1,277,109 | Patterson | Aug. 27, 1918 |
| 1,277,111 | Patterson | Aug. 27, 1918 |
| 1,309,784 | Spencer | July 15, 1919 |
| 1,740,229 | Dorey | Dec. 17, 1929 |
| 1,869,823 | Reader | Aug. 2, 1932 |
| 2,179,161 | Rambusch et al. | Nov. 7, 1939 |
| 2,232,543 | Logan | Feb. 18, 1941 |
| 2,310,810 | Rolph | Feb. 9, 1943 |

FOREIGN PATENTS

| Number | Country | Date |
| --- | --- | --- |
| 655,651 | France | Apr. 22, 1929 |